United States Patent [19]

Kagawa

[11] Patent Number: 4,615,957
[45] Date of Patent: Oct. 7, 1986

[54] SODIUM-SULFUR STORAGE BATTERY
[75] Inventor: Hiroshi Kagawa, Takatsuki, Japan
[73] Assignee: Yuasa Battery Co., Ltd., Osaka, Japan
[21] Appl. No.: 724,989
[22] Filed: Apr. 19, 1985
[30] Foreign Application Priority Data Apr. 19, 1984 [JP] Japan .................. 59-79901[U]
May 8, 1984 [JP] Japan .................. 59-92503
May 8, 1984 [JP] Japan .................. 59-93504

[51] Int. Cl.⁴ .......................................... H01M 10/39
[52] U.S. Cl. ................................................ 429/104
[58] Field of Search ...................................... 429/104

[56] References Cited

U.S. PATENT DOCUMENTS

| | | | |
|---|---|---|---|
| 4,049,884 | 9/1977 | Desplanches et al. | 429/104 |
| 4,070,527 | 1/1978 | King et al. | 429/104 |
| 4,076,900 | 2/1978 | Mehaute et al. | 429/104 |
| 4,084,041 | 4/1978 | Ludwig | 429/104 |
| 4,188,463 | 2/1980 | Arcuri | 429/104 |
| 4,218,524 | 8/1980 | Dunn et al. | 429/104 |

Primary Examiner—Donald L. Walton
Attorney, Agent, or Firm—Burns, Doane, Swecker & Mathis

[57] ABSTRACT

The present disclosure describes a sodium-sulfur storage battery comprising a sodium-ion conductive solid electrolyte tube; a positive electroconductive material consisting of graphite felt or carbon felt, and a metal sulfide layer disposed between the solid electrolyte tube and the positive electro-conductive material. Said metal sulfide layer may be sulfurated metal such as aluminum, nickel, copper, iron, tin, zinc, lead, magnesium and chrome. A metal member may be disposed between the solid electrolyte tube and the positive electroconductive material to form said metal sulfide layer by a sulfurated part formed at least at the surface of said metal member.

10 Claims, 6 Drawing Figures

SODIUM-SULFUR STORAGE BATTERY

BACKGROUND AND SUMMARY OF THE INVENTION

The present invention relates to a positive electrode of a sodium-sulfur storage battery, in which metal sulfide layer is disposed between positive electroconductive material and a solid electrolyte tube for increasing utilization factor of positive reactant.

Conventionally, as shown in FIG. 1 which is a longitudinally sectional view, a sodium-sulfur storage battery is provided with a positive chamber formed around a solid electrolyte tube 1 made from beta-dash-alumina, beta-alumina or the like which is permeable to sodium ion. An alpha-alumina ring 2 is jointed with glass to the upper end of the tube 1, and a positive cover 3 is thermocompressively joined to the lower surface of the alpha-alumina ring 2. Positive electroconductive material 6 such as graphite felt or carbon felt in which positive reactant 5 such as sulfur or sodium polysulfide is impregnated is disposed between the solid electrolyte tube 1 and a battery housing 4 welded to the positive cover 3. A circular plate 7 of graphite felt is disposed at the bottom, and a bottom cover 8 is welded to the battery housing 4. At a battery operation temperature from 300° C. to 370° C., when the battery is discharged, sodium of negative reactant is ionized, passes through the solid electrolyte tube 1 and reacts on the positive reactant 5 in the positive chamber to form discharge product $Na_2S_x$. When the composition of the positive reactant 5 in the positive electroconductive material 6 changes to $Na_2S_{2.7}$ to $Na_2S_{3.0}$, the discharge stops. When charged, the sodium in the discharge product returns to the negative chamber. As shown in FIG. 2, at prompt discharge, all sulfur becomes discharge uncomposition, and theoretical capacity value is recognized. However, at one cycle charge, only about 70% of the reactant is utilized for the charge. Further, at the charge-discharge cycles thereafter, it shows similar tendency, and the charging volume at 150 cycles becomes 54% of the theoretical capacity value and the utilization factor of the positive reactant becomes about 54%. It is also recognized in tests of another batteries that the charging value and the utilization factor further decrease after above cycles.

Accordingly, it is an object of the invention to provide an improved sodium-sulfur storage battery, in which utilization factor of positive reactant is improved.

The essence of the present invention is to dispose metal sulfide layer between positive electroconductive material and a solid electrolyte tube for increasing utilization factor of positive reactant.

The embodiment of the invention is described by way of example, with reference to the accompanying drawings.

DESCRIPTION OF THE PREFERRED EMBODIMENT

Figure 1:
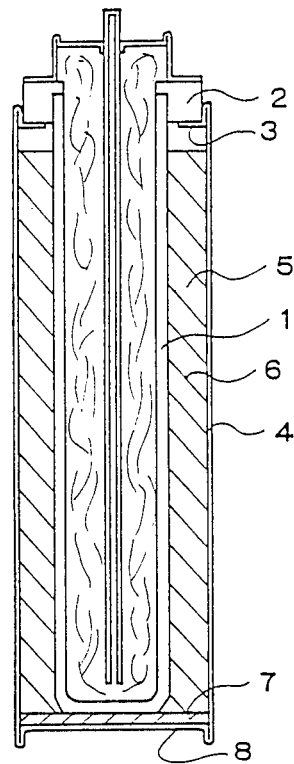
FIG. 1 is a longitudinally sectional view of a conventional sodium-sulfur storage battery.
Figure 3:
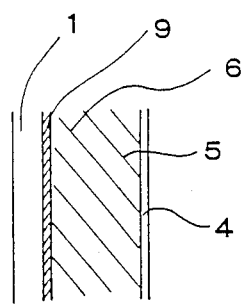
FIG. 3 is a fragmentary enlarged sectional view of a storage battery according to the invention.
Figure 4:
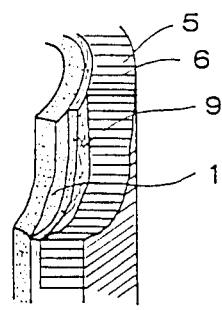
FIG. 4 is an enlarged perspective view of the storage battery in FIG. 3 with a certain part cut-away.

Referring to FIGS. 3 and 4, same members and parts as those in FIG. 1 bear same reference numbers. In the illustrated embodiment, a metal member 9, at least a surface of which is sulfurated, is disposed between a solid electrolyte tube 1 and positive electroconductive material 6.

The metal member 9 is provided with passages (not shown) through which sodium ion is adapted to pass to positive reactant 5. In order to form the passage, the metal member 9 is preferably made from porous material such as fiber (felt-like nonwoven fabric, nonwoven fabric consisting of pressurized and burnt fiber and others), knit, sintered member of fiber or powder, plate-like fabric or sintered member provided with infinite pores or slits or net. According to test, the fabric achieves the best utilization factor of 94%–96% at one cycle. The knit achieves the factor of 86%–90%, the sintered member achieves the factor of 87%–92%, the member with pores or slits achieves the factor of 72%–76% and the net achieves the factor of 75%–83%, respectively at one cycle. The material of the metal member 9 is preferably simple substance or alloy such as aluminum, copper, nickel, iron, zinc, lead, tin, stainless steel and magnesium, or is preferably be coated with such metal, so that the surface of the whole body of the member 9 may be facilely corroded by the sulfur or sodium polysulfide. The iron is particularly preferable as the member 9. A thickness of the metal member 9 is desirably 2 mm or less. If the thickness is more than 2 mm, the sulfuration of the metal causes reduction of an amount of the effective sulfur in the positive reactant 5 which contributes to battery reaction, resulting in reduction of a battery capacity. Further, the thickness more than 2 mm increases a thickness of metal sulfide layer, so that transference of the sodium ion is interfered, and thus, an internal resistance increases, which also deteriorates the battery performance. Although, the porosity of the metal member 9 is one of the factors, it does not particularly affect the performance, if the volume percentage is in a range from about 75% to 98%. By merely adding the extra amount of the sulfur in accordance with sulfuration of the metal member 9 the intended performance can be maintained. The embodiments will be described more in detail hereinafter.

Figure 2:
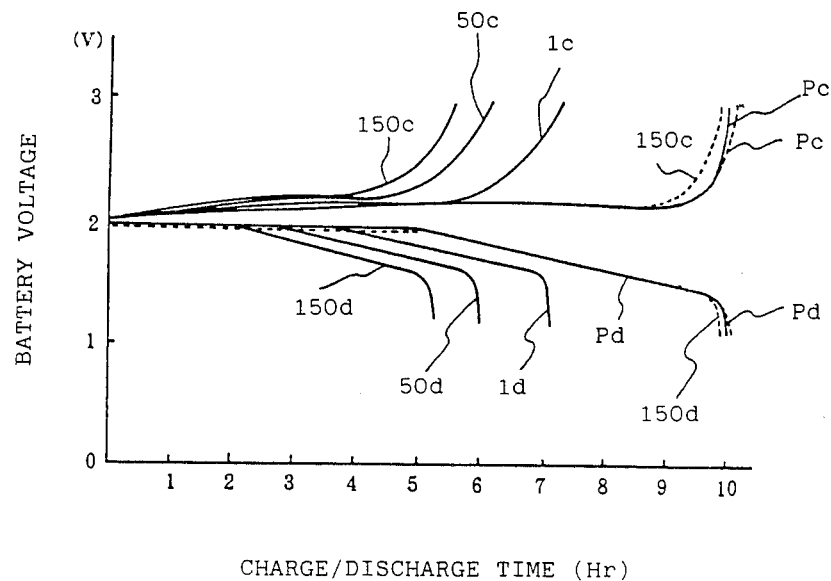
FIG. 2 is a graph showing characteristics of undischarge voltage.
Figure 5:
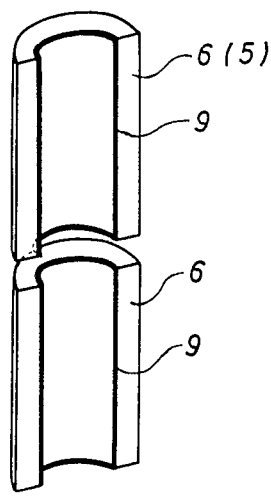
FIG. 5 is a fragmentary perspective view of a divided structure of a positive electroconductive material and a metal member.
Figure 6:
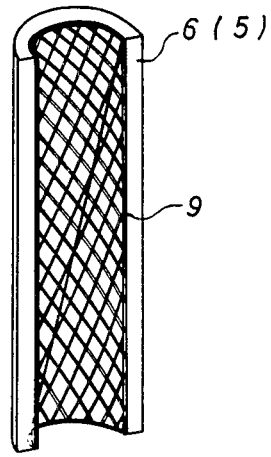
FIG. 6 is a fragmentary perspective view of another embodiment of a divided strucutre.

The metal member 9 is the nonwoven fabric which is 0.4 mm in thickness, includes the pores having a mean diameter of about 150μ and is made from iron fiber which is about 25μ in diameter and about 5 to 100 mm in length. The metal member 9 is disposed on the inner surface of the positive electroconductive material 6, and is impregnated with sulfur and molded under pressure to form a molded body of a positive electrode divided longitudinally into two pieces. According to this structure, as indicated by a dotted line in FIG. 2, reduction of the battery capacity is scarcely recognized even after 150 cycles, and the utilization factor of the positive reactant is approximately 94%. Further, the invention has such additional feature that, as shown in FIGS. 5 and 6 which will be detailed later, the metal member 9 is longitudinally, transversely and/or obliquely divided into at least two pieces so as to facilitate the accommodation or molding of the metal member 9, and this division is same as that of the positive electroconductive material 6. This facilitates the handling because the metal member 9 is fixed on the surface of the positive electroconductive material 6 by the positive reactant 5. Further, by the accommodation of the metal member 9. when the temperature of the battery increases to a battery operation temperature, the positive reactant 5 melts and operates to press and contact the positive electroconductive material 6 onto the surface of the solid electrolyte tube 1. The primary cause by which the utilization factor of the positive reactant increases, according to the structure of the invention, is that the sulfurated metal member 9 operates as an electric resistance layer between the positive electroconductive material 6 and the solid electrolyte tube 1, and partially enters into the positive electroconductive material 6 while taking the form of the mud-like substance, so that electric resistance grade is formed, which prevents segregation of the sulfur during the charging and sufficiently promotes the reaction ($Na_2Sx \rightarrow 2Na + xS$) of the positive reactant 5 in the positive electroconductive material 6. This effect appears remarkably in accordance with the sulfuration of the metal member 9, i.e., the increasing of the charge-discharge cycles.

Referring to FIG. 5, in which only a half side of the divided structure is illustrated, the positive electroconductive material 6 made from the graphite felt and the metal member 9 made from the stainless steel felt are divided respectively longitudinally and transversely into two pieces, i.e., totally four pieces. The metal member 9 is associated to the inner surface of the positive electroconductive material 6. The positive reactant 5 of the sulfur is impregnated therein, and they are molded under a pressure.

Referring to FIG. 6, in which only a half side of the divided structure is illustrated, the positive electroconductive material 6 of the graphite felt is longitudinally divided into two pieces. The metal member 9 of the aluminum net is associated to the inside of the positive electroconductive material 6. They are divided obliquely into totally four pieces. Each piece is molded under a pressure together with the positive reactant 5 of the sulfur impregnated therein.

Another embodiments will be described hereinafter.

EMBODIMENT 1

Stainless steel felt of which fiber diameter is $8\mu$ is molded under pressure to form the metal member 9 having a thickness of 0.8 mm and a porosity of 94%. In a case that this metal member 9 is employed, the discharge capacity is 150 AH at 150 cycles, while the prompt discharge capacity is 156 AH.

EMBODIMENT 2

Copper wire of which diameter is 0.1 mm is formed into a net structure having a thickness of 0.4 mm. In this case, the utilization factor of the positive reactant is approximately 78% at 150 cycles.

According to the above embodiments, the metal sulfide layer is formed by the sulfurated part formed at least at the surface of the metal member 9. However, instead of those structures, the the metal sulfide layer may be formed as follows.

Mud-like iron sulfide is applied on the inner surface of the positive electroconductive material 6 to form the metal sulfide layer (9) having a thickness of about 1 mm.

According to this structure, same operation and effect as those of aforementioned embodiments can be achieved, which will be apparent from following embodiments.

EMBODIMENT 3

When copper sulfide is applied on the inner surface of the positive electroconductive material 6 into which sulfur is impregnated to form the layer having a thickness of 0.8 mm, the discharge capacity at 156 cycles is about 146 AH, while the prompt discharge capacity is 156 AH.

EMBODIMENT 4

When nickel sulfide layer of 1.4 mm in thickness is formed, the utilization factor of the positive reactant is about 77% at 150 cycles.

The size and another specifications of the metal member 9 and metal sulfide layer may be modified in accordance with the shape and size of the battery, and the length, width thickness, porosity, days required for the sufficient sulfuration and amount of the sulfur for the sulfuration are not restricted to those in the aforementioned embodiments.

As stated hereinbefore, the present invention can effectively increase the utilization factor of the positive reactant in the sodium-sulfur storage battery, and thus, has large industrial value.

What is claimed is:

1. A sodium-sulfur storage battery comprising a sodium-ion conductive solid electrolyte tube; a positive electroconductive material consisting of graphite felt or carbon felt, a metal sulfide layer disposed between the solid electrolyte tube and the positive electroconductive material, and a metal member disposed between the solid electrolyte tube and the positive electroconductive material, said metal sulfide layer being formed by a sulfurated part formed at least at the surface of said metal member.

2. A sodium-sulfur storage battery of claim 1 wherein the metal sulfide layer is molded and fixed by positive reactant to the surface of the positive electroconductive material, and is adapted to be pressed onto the surface of the solid electrolyte tube at a battery operation temperature.

3. A sodium-sulfur storage battery of claim 1 wherein said metal sulfide layer is sulfurated metal such as aluminum, nickel, copper, iron, tin, zinc, lead, magnesium and chrome.

4. A sodium-sulfur storage battery of claim 2 wherein said metal sulfide layer is 2 mm or less in thickness.

5. A sodium-sulfur storage battery of claim 1 wherein said metal member is 2 mm or less in thickness.

6. A sodium-sulfur storage battery of claim 1 wherein said metal member is porous.

7. A sodium-sulfur storage battery of claim 1 wherein said metal member consists of fabric such as felt or nonwoven fabric, knit, a plate-like body including pores or slits or a sintered body.

8. A sodium-sulfur storage battery of claim 1 wherein said metal member is divided longitudinally, transversely or obliquely into at least two pieces.

9. A sodium-sulfur storage battery of claim 1 wherein said metal member is coated by or made from alloy or simple substance such as aluminum, nickel, copper, iron, tin, zinc, lead, magnesium, chrome and stainless steel.

10. A sodium-sulfur storage battery of claim 1 wherein said metal member is adapted to be sulfurated by positive reactant impregnated into the positive electroconductive material.

* * * * *